United States Patent

[11] 3,629,905

[72] Inventor Delmer J. Cote
 624 Arch St., New Britain, Conn. 06051
[21] Appl. No. 47,017
[22] Filed June 17, 1970
[45] Patented Dec. 28, 1971

[54] BREAD BAG RESEALER
 2 Claims, 3 Drawing Figs.
[52] U.S. Cl.................................................. 24/30.5 R,
 24/73 MS, 24/255 P
[51] Int. Cl...................................................... A44b 21/00
[50] Field of Search.......................................... 24/30.5 R,
 49 M, 73 MS, 255, 11 P, 30.5

[56] References Cited
 UNITED STATES PATENTS
2,585,421 2/1952 Armand ....................... 24/255 P

| 579,601 | 3/1897 | Neuenschwander | 24/255 GP X |
| 918,329 | 4/1909 | King | 24/255 P |
| 985,714 | 2/1911 | Tutton | 24/30.5 R |
| 3,529,328 | 9/1970 | Davison | 24/73 MS UX |

FOREIGN PATENTS

| 713,114 | 8/1931 | France | 24/30.5 R |

Primary Examiner—Donald A. Griffin

ABSTRACT: A clipping device for resealing a bag containing a loaf of bread after having been opened up, the device comprising an elongated clip having flat straight jaws between which the mouth of the bag may be retained in closed position, and one end of the jaws being connected to a resilient spring member normally urging the jaws toward a pivotally closed position.

PATENTED DEC 28 1971   3,629,905

INVENTOR
DELMER J. COTE

BREAD BAG RESEALER

This invention relates generally to clamps. More specifically it relates to easily openable clips.

It is generally well known that commercially baked breads are retailed within bread bags within which the bread is individually sealed so to preserve freshness. Such bags may be comprised of waxed paper folded around the bread and heat sealed, to form the bag, or it may comprise a polyethylene preformed bag into which the bread is inserted. Alternately it may comprise both enclosures. After such enclosure is opened, it is difficult to reseal it so to retain moisture of the bread and prevent dryness thereof. This is particularly evident in the wax paper wrapped breads. This situation is of course objectionable and accordingly in want of improvement.

Therefore it is a principal object of the present invention to provide a bread bag resealer having self contained means to quickly and easily reclose the bag after the bag has been opened so as to remove bread slices from the bread.

Another object is to provide a bread bag resealer which comprises a simple clamp having jaws between which the mouth of the bag can be retained closed.

Yet another object is to provide a bread bag resealer wherein the jaws are normally urged into a closed position by spring means and possibly additionally by magnetic means.

Another object is to provide a bread bag resealer for home use and which can be reused for subsequent purchased loaves of bread.

Other objects are to provide a bread bag resealer which is simple in design, inexpensive to manufacture, rugged in construction, easy to use and efficient in operation.

These and other objects will be readily evident upon a study of the following specification and the accompanying drawing wherein.

Figure 1:
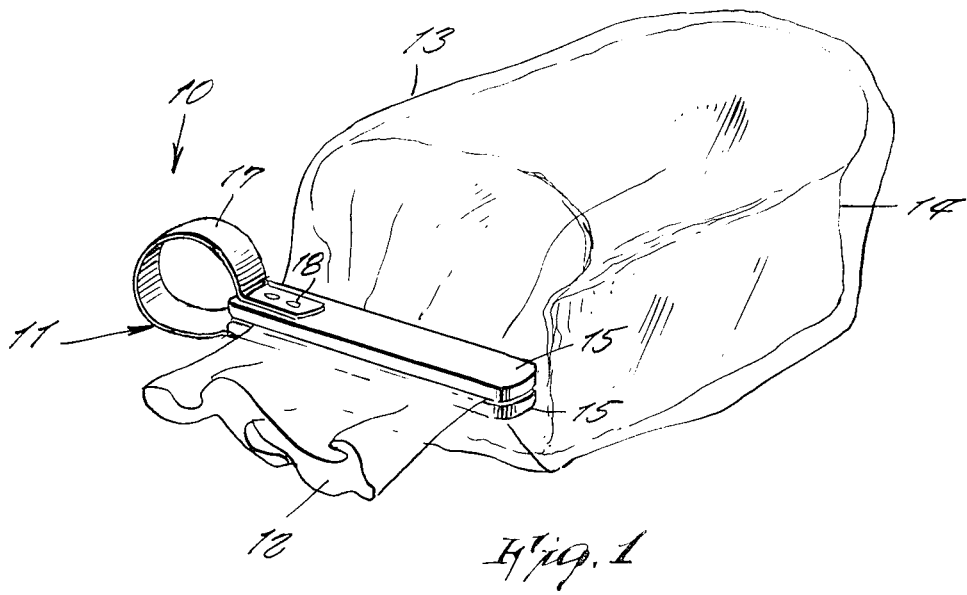
FIG. 1 is a perspective view of the present invention shown in operative use.

Referring now to the drawing in detail, the reference numeral 10 represents a bread bag resealer according to the present invention wherein there is a clamp assembly 11 for resealing a mouth 12 of a bag 13 containing a remaining portion of a bread loaf 14 from which bread slices have been removed.

The clamp assembly 11 is comprised of a pair of spaced-apart jaws 15 of elongated character having flat straight interengaging faces 16 between which the bag mouth is fitted. At one end, the jaws are secured to opposite ends of a spring steel clip 17 for normally urging the jaws toward each other into a clamping position, the clip being attached to the jaws by rivets 18.

In operative use, after bread slices are removed, the bread bag is resealed by simply separating the jaws and filling them over the bag mouth so to close the same as shown in FIG. 1.

Figure 2:
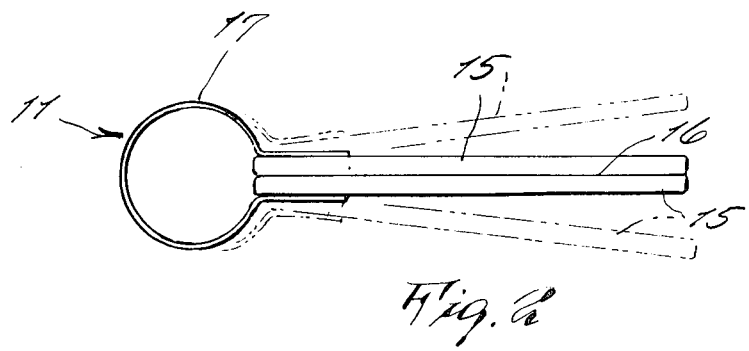
FIG. 2 is a side view thereof showing in phantom lines the device in an opened position.
Figure 3:
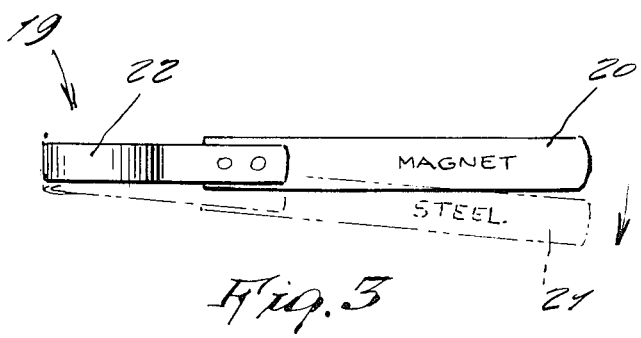
FIG. 3 is a top view of a modified design of the invention wherein magnetic means are employed to maintain the bread bag in a closed position.

In a modified design of the invention shown in FIG. 3, the resealer 19 includes jaws 20 and 21 one of which is of steel and the other a permanent magnet for normally urging the jaws into a closed position. In this form of the invention the spring clip 22 secured to one end of the jaws may be made to normally urge the jaws apart. In operative use, this form of the invention normally seals the bag by the jaws being held together by a magnetic attraction of the jaws toward each other. In order to open the bag, it is only necessary to slide the jaws sidewardly respective to each other as indicated by the phantom lines thus allowing easy effort for magnetic separation thereof, and after such magnetic separation, the clip will spring the jaws apart to the position shown in phantom in FIG. 2. Such open position allows easy insertion of the bag again between the jaws after which the jaws are depressed together for magnetic hold again, thus providing an easier and quicker handling of the tool.

Alternately the jaw mating faces may be of arcuate interfitting contour.

While various changes may be made in the detail construction, it is to be understood that such changes will be in the spirit and scope of the present invention.

I claim:

1. In a bread bag resealer, the combination of a clamp comprised of a pair of elongated opposing jaws, each of said jaws having a straight correspondingly mating edge, said jaws being pivotably connected at one end with spring means exerting transverse opening force on said jaws, in combination with means urging said jaws together when said jaws are in opposing alignment, said spring means being laterally flexible to permit lateral displacement of said jaws.

2. A bag resealer as in claim 1 wherein the second said means comprises jaws that are magnetically attracted.

* * * * *